United States Patent
Lee et al.

(10) Patent No.: US 6,406,732 B1
(45) Date of Patent: Jun. 18, 2002

(54) ENHANCED CONFECTIONERY MOLDING

(75) Inventors: Ralph D. Lee, Hampton, NJ (US); Tracy D. B. Ziener, Bracknell (GB); Neil A. Willcocks, Columbia, NJ (US); William Harding, Gloucester; Frank W. Earis, Maidenhead, both of (GB); Thomas M. Collins, Nazareth, PA (US)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/341,428

(22) PCT Filed: Jan. 9, 1998

(86) PCT No.: PCT/US98/00605
§ 371 (c)(1),
(2), (4) Date: Jan. 6, 2000

(87) PCT Pub. No.: WO98/30110
PCT Pub. Date: Jul. 16, 1998

Related U.S. Application Data

(63) Continuation-in-part of application No. 08/782,902, filed on Jan. 11, 1997, now abandoned
(60) Provisional application No. 60/035,379, filed on Jan. 11, 1997.

(51) Int. Cl.$^7$ .............................. A23P 1/10; A23G 1/23
(52) U.S. Cl. .................... 426/515; 426/660; 249/114.1; 249/116; 249/135
(58) Field of Search .................... 426/660, 515, 426/631; 249/116, 114.1, 135

(56) References Cited

U.S. PATENT DOCUMENTS

| | | | |
|---|---|---|---|
| 4,426,402 A | * | 1/1984 | Kaupert |
| 4,888,196 A | | 12/1989 | Ehrman et al. ............. 426/601 |
| 4,910,037 A | | 3/1990 | Sagi et al. .................. 426/601 |
| 5,188,858 A | | 2/1993 | Stipp et al. ................. 426/531 |
| 5,275,835 A | | 1/1994 | Masterson et al. .......... 426/607 |
| 5,409,722 A | * | 4/1995 | Binley |
| 5,514,390 A | | 5/1996 | Aasted ........................ 426/231 |
| 5,635,230 A | | 6/1997 | Aasted ........................ 426/138 |
| 5,705,217 A | * | 1/1998 | Aasted |

FOREIGN PATENT DOCUMENTS

| | | |
|---|---|---|
| EP | 0589820 | 3/1994 |
| GB | 2070501 | 9/1981 |
| WO | 94/07375 | 4/1994 |
| WO | 95/32633 | 12/1995 |

OTHER PUBLICATIONS

Minifie, "Chocolate, Cocoa, and Confectionery", third edition, pp. 190–192, 198–215, 1989.*
Minifie, "Chocolate, Cocoa and Confectionery", second edition, pp. 167–173, 1980.*
Beckett, "Industrial Chocolate Manufacture and Use", second edition, pp. 228–237, 1994.*
Minifie, B. W., Chocolate, Cocoa and Confectionery, $3^{rd}$ ed. pp. 183 and 198–206 (1989).
Whetstone, H., "Moulds and Moulding: Examples and Techniques", The Manufacturing Confectioner, pp. 93–99 (Jun. 1996).
Aasted, A., "Frozen Cone Technology", The Manufacturing Confectioner pp. 75–78 (May 1997).

* cited by examiner

*Primary Examiner*—Nina Bhat
(74) *Attorney, Agent, or Firm*—Fitzpatrick, Cella, Harper & Scinto

(57) ABSTRACT

Methods are disclosed for rapidly molding chocolate products.

9 Claims, 1 Drawing Sheet

ENHANCED CONFECTIONERY MOLDING

This application is a continuation-in-part of U.S. Patent application Ser. No. 08/782,902 filed Jan. 11, 1997, now abandoned, and claims the benefit of U.S. Provisional Application No. 60/035,379, filed Jan. 11, 1997.

BACKGROUND OF THE INVENTION

1. Field of the Invention

The invention relates to methods for rapidly molding chocolate products.

2. Related Background Art

Documents and references pertaining to the field of this invention are cited in this disclosure with a full citation for each; and, each cited document is hereby incorporated by reference.

Chocolates and chocolate-like compositions having a desired three-dimensional shape (herein referred to as "molded chocolates") are conventionally produced by molding. Molding is the casting of liquid chocolate into molds (plastic or metal) followed by cooling and demolding. The finished chocolate may be a solid block, a hollow shell, or a shell filled with a confectionery material such as fondant, fudge or soft caramel (*Chocolate, Cocoa and Confectionery: Science and Technology* by Bernard W. Minifie, Third Edition, page 183).

The term molding includes methods wherein chocolate is deposited into molds, allowed to cool and hardened into solid pieces. The chocolates used in molding processes usually can be somewhat more viscous than coating chocolates since the chocolate can be vibrated and/or forced into a mold over a longer period of time than allowed in enrobing, for example. However, chocolate molded with food inclusions generally must be as fluid as coating chocolates.

Molded chocolate products are conventionally produced by depositing tempered chocolate having a liquid fat phase into molds, allowing the chocolate to cool and harden into solid pieces before demolding the chocolate (*Chocolate, Cocoa and Confectionery: Science and Technology* by Bernard W. Minifie, Third Edition, pages 198–206). The most commonly used method of producing a shaped chocolate involves the following sequential steps:

A. heating the chocolate to soften, i.e., melting of the fat phase;
B. tempering the chocolate;
C. depositing the tempered chocolate into a mold;
D. shaking the mold to remove air bubbles and fully distribute the chocolate in the mold cavity;
E. cooling to harden the chocolate; and
F. removing said set shaped chocolate from said mold ("de-molding").

One disadvantage of the conventional molding process is the excessive time required to fill the mold, shake the mold to remove air pockets and solidify the chocolate to form a shaped piece. The cooling time required for molding chocolate products often exceeds 20 minutes for a small (about 1 g) piece, and 40 minutes for a large (about 100 g) piece. For complex shell molded products, which require numerous production steps, the total production time can be of the order of 1–2 hours. Demolding of molded chocolate products is typically accomplished by using impact force to free the products from the molds. The length of the molding cycle greatly reduces the efficiencies of such commercial production lines and requires the use of a large number of molds.

U.S. Pat. No. 4,426,402 to Kaupert relates to a method and apparatus for producing chocolate forms in molding tools consisting of several parts which together define a molding cavity corresponding to the chocolate form to be produced, the cavity being closed except for an inlet opening through which heated chocolate is injected under pressure until the cavity is completely filled with chocolate. The solidification of the chocolate may be achieved by cooling the molding tool.

PCT Patent Publication WO 95/32633 to Aasted relates to a method for producing molded shells of fat-containing, chocolate-like masses wherein a mold cavity is filled with a mass and a cooling member having a temperature below 0° C. is subsequently immersed in the mass to define a predetermined shell volume between the member and the mold cavity.

U.K. Patent publication GB 2 070 501 relates to making confections, such as chocolates and the like, of substantially uniform size. The method involves the steps of depositing a gob of flowable confectionery substance onto a surface, surrounding the gob in spaced relationship with an annular mold, exerting pressure upon the gob to cause the gob to spread apart and come into contact with the mold causing the gob to set so as to form a confectionery body in the mold and separating the confectionery body and the mold from one another. Pressure is exerted on the gob by a ram. It is advantageous if the annular mold has a hollow circumferential wall, and if a cooling fluid circulates through this hollow wall to create a cooling channel so as to obtain a rapid chilling (and thus setting) of the gob. The inner circumference of the mold may have any desired regular or irregular shape, depending upon what shape is desired to impose upon the finished confectionery body.

European Patent Application 0 589 820 to Aasted relates to a method for producing molded outer shells of fat-containing, chocolate-like masses wherein a mold cavity is filled with a tempered chocolate-like mass which solidifies from the mold cavity inwardly to form the outer shape of the shell, the temperature of the mold cavity being lower than the temperature of the tempered mass. The mold cavity is filled with a chocolate-like mass in an amount which is just slightly larger than the volume of the finished shell. A cooling member, which has preferably been cooled to −15 to −30° C., is then immersed into the chocolate mass and kept in a fully immersed position for about 2 to 3 seconds. The chocolate-like mass will then rapidly solidify and readily release the cooling member, which can be lifted up and out of the mold of the cavity.

PCT Patent Publication WO 94/07375 to Cebula et al. relates to forming fat-containing products such as chocolate in molds at temperatures at or below 0° C. to provide unforced demolding.

Thus, the development of methods which increase the speed and efficiencies of molded chocolate processing lines, while at the same time providing stable glossy molded chocolate confectionery products, would be a valuable addition to the art.

The above-identified methods of producing molded chocolate products using conventional molds and conventional molding practices are characterized by long cycle times, which decrease efficiency by requiring use of large numbers of molds and long cooling tunnels. It would therefore be highly desirable to provide a method of making molded products in a more efficient manner.

SUMMARY OF THE INVENTION

This invention relates to a method of preparing a stable molded chocolate product by the steps of: (a) depositing a chocolate composition containing a liquid fat phase onto a contacting surface of a mold, wherein the mold has an average temperature greater than about 10° C.; (b) cooling the chocolate composition under conditions effective to produce an average cooling rate in a center of the chocolate composition of from about 3° C./minute to about 10° C./minute; and (c) removing the product from the mold.

In still another embodiment of this invention, fat-based confection product is molded by the steps of: (a) depositing a fat-based confection composition containing a liquid fat phase into a mold constructed of a material having a thermal conductivity greater than about 150 W/m° C., more advantageously greater than about 200 W/m° C., and having a temperature above about 10° C.; and (b) cooling the mold to a temperature less than about −5° C. for a time sufficient to achieve complete demolding of the fat-based confection product.

DETAILED DESCRIPTION OF THE INVENTION

Figure 1:
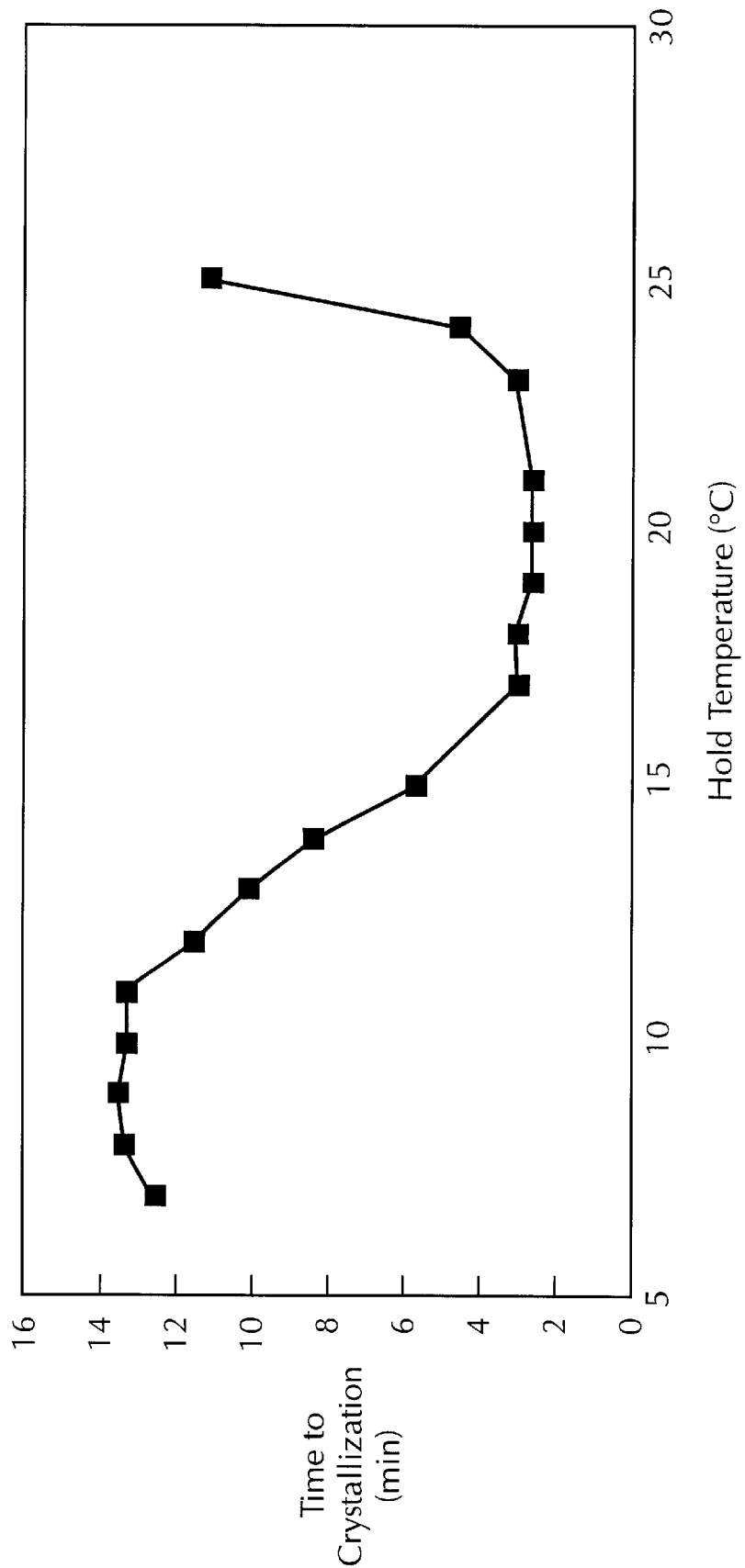
FIG. 1 is a graph illustrating crystallization time of chocolate as a function of temperature.

Definitions
1. Chocolate

The term "chocolate" is intended to refer to all chocolate or chocolate-like compositions with a temperable fat phase. As the invention is directed to the control of the characteristics of the fat or fat-like phase of the chocolate, rather than the non-fat materials within the chocolate, the term is intended to include all chocolate and chocolate-like compositions that contain at least one cocoa or cocoa-like component in the temperable fat or temperable fat-like phase. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, non-standardized chocolates and chocolate-like compositions, unless specifically identified otherwise.

The fat phase of the chocolate of the present invention can include cocoa butter, milkfat, anhydrous milkfat, butteroil, and other fats which are tempered like cocoa butter or mixtures of cocoa butter with these other fats (see definition of "temperable fats" below). See Minifie, *Chocolate, Cocoa and Confectionery Science and Technology* 3rd Ed. pages 100–109.

The invention does not include chocolates which do not contain fats that behave similar to cocoa butter, i.e., are not temperable like cocoa butter and are not polymorphic like cocoa butter. Examples of fats not included in the present invention are any vegetable fats or modified vegetable fats or combinations of these fats which are not tempered like cocoa butter. More specifically, the chocolates of the present invention should display crystallization kinetics similar to those kinetics displayed by cocoa butter based chocolate such as, for example, SOI chocolates.

In the United States, chocolate is subject to a standard of identity established by the U.S. Food and Drug Administration (FDA) under the Federal Food, Drug and Cosmetic Act. Definitions and standards for the various types of chocolate are well established in the U.S. Nonstandardized chocolates are those chocolates which have compositions which fall outside the specified ranges of the standardized chocolates.

Chocolates also includes those containing crumb solids or solids fully or partially made by a crumb process.

Examples of nonstandardized chocolates result when the nutritive carbohydrate sweetener is replaced partially or completely; or when the cocoa butter or milkfat are replaced partially or completely; or when components that have flavors that imitate milk, butter or chocolate are added or other additions or deletions in formula are made outside the USFDA standards of identify of chocolate or combinations thereof.

The chocolate may contain a sugar substitute. The term "sugar substitute" includes bulking agents, sugar alcohols (polyols), or high potency sweeteners or combinations thereof. In an alternative embodiment of the present invention, a sugar substitute may partially replace the nutritive carbohydrate sweetener. The high potency sweeteners include aspartame, cyclamates, saccharin, acesulfame, neohesperidin dihydrochalcone, sucralose, alitame, stevia sweeteners, glycyrrhizin, thaumatin and the like and mixtures thereof. The preferred high potency sweeteners are aspartame, cyclamates, saccharin, and acesulfame-K. Examples of sugar alcohols may be any of those typically used in the art and include sorbitol, mannitol, xylitol, maltitol, isomalt, lacitol and the like.

The chocolates may also contain bulking agents. The term "bulking agents" as defined herein may be any of those typically used in the art and include polydextrose, cellulose and its derivatives, maltodextrin, gum arabic, and the like.

The chocolate products of the present invention may contain emulsifiers. Examples of safe and suitable emulsifiers may be any of those typically used in the art and include lecithin derived from vegetable sources such as soybean, safflower, corn, etc., fractionated lecithins enriched in either phosphatidyl choline or phosphatidyl ethanolamine or both, mono- and digylcerides, diacetyl tartaric acid esters of mono- and diglycerides (also referred to as DATEM), PGPR, monosodium phosphate derivatives of mono- and diglycerides of edible fats or oils, sorbitan monostearate, hydroxylated lecithin, lactylated fatty acid esters of glycerol and propylene glycol, polyglycerol esters of fatty acids, propylene glycol mono- and diester of fats and fatty acids, or emulsifier that may become approved for the USFDA-defined soft candy category. In addition, other emulsifiers that can be used in the present invention, include polyglycerol polyricinoleate, ammonium salts of phosphatidic acid, sucrose esters, oat extract, etc., any emulsifier found to be suitable in chocolate or similar fat/solid system or any blend provided the total amount of emulsifier does not exceed 1% by weight. Emulsifiers preferred for use in the present invention are lecithin, fractionated lecithin, diacetyl tartaric acid esters of mono- and diglycerides (DATEM) or mixtures of these emulsifiers at a maximum level of 1% of any one emulsifier or any mixture of emulsifiers.

Nutritive carbohydrate sweeteners with varying degrees of sweetness intensity useful in the present invention may be any of those typically used in the art and include, but are not limited to, sucrose, e.g. from cane or beet, dextrose, fructose, lactose, maltose, glucose syrup solids, corn syrup solids, invert sugar, hydrolyzed lactose, honey, maple sugar, brown sugar, molasses and the like. The nutritive carbohydrate sweetener, preferably sucrose, will be present in the chocolate as crystals or particles.

2. The term "chocolate confection" refers to chocolate products that are stable at ambient temperatures for extended periods of time (i.e., greater than 1 week). These products are characterized as microbiologically shelf-stable at 65°–85° F. under normal atmospheric conditions. The term "confection" is not intended to include ice cream products or other products that are typically stored at temperatures below 0° C. and which are designed to be consumed while in a frozen state. As a confection, chocolate can take the form of solid pieces of chocolate, such as bars or novelty shapes, and can also be incorporated as a component of other, more complex confections where chocolate is combined with and generally coats other foods such as caramel, nougat, fruit pieces, nuts, wafers or the like. Other complex confections result from surrounding soft inclusions such as cordial cherries or peanut butter with chocolate and other complex confections result from coating ice cream or other frozen or refrigerated desserts with chocolate. However, chocolate coatings on ice cream or other frozen products typically do not contain stable fat crystals and are not included in the present invention.

3. The term "chocolate-like compositions" refers to chocolate flavored compositions containing solid particles dispersed in a fat or fat-like phase.

4. Set Chocolate Product

The term "set chocolate product" refers to a chocolate product in which sufficient fat has solidified at a given temperature to provide the product with a minimum degree of physical integrity, such that its shape and appearance are maintained at the given temperature.

5. The term "fats", as used herein, refer to triglycerides, diglycerides and monoglycerides that can normally be used in chocolates and chocolate-like products. Fats include the naturally occurring fats and oils such as cocoa butter, pressed cocoa butter, expeller cocoa butter, solvent extracted cocoa butter, refined cocoa butter, milkfat, anhydrous milkfat, fractionated milkfat, milkfat replacers, butterfat, fractionated butterfat, cocoa butter equivalents (CBE), cocoa butter substitutes (CBS) and synthetically modified fats such as Caprenin®.

6. Chocolate Setting Temperature

The term "chocolate setting temperature" refers to the temperature to which a chocolate composition must be cooled to produce a "set chocolate product".

7. Chocolate Composition Comprising a Liquid Fat Phase

The term "chocolate composition comprising a liquid fat phase" refers to a chocolate or chocolate-like composition where the fat phase is liquid or partially liquid.

8. Continuous Fat Phase

The term "continuous fat phase" refers to the fat phase of a chocolate which represents the continuous phase into which are dispersed the non-fat particles, added seeding agent particles and any conventionally produced fat seed crystals, where the chocolate in a fluid state is representative of a solid in liquid dispersion.

9. The term "crystalline fat" refers to a liquid fat which has been cooled to allow the fat to undergo a phase transition to any of a number crystalline forms or polymorphs. For example cocoa butter may crystallize as any one six recognized polymorphs.

10. The term "temper" refers to the presence of stable fat crystals in a chocolate composition. Thus, a chocolate composition which has gone through a tempering process is referred to as a tempered chocolate composition. The degree or level of temper in a chocolate can be measured by commercially available instruments which characterize the behavior of a chocolate sample during controlled cooling. An example of this type of instrument is the Tricor Tempermeter [Tricor Instruments, Elgin, Ill.] which in its standard embodiment, determines chocolate temper during a 5 minute controlled cooling test. Specifically, the Tricor Tempermeter detects and measures an inflection point in a temperature versus time curve or trace. The units of temper, using the Tricor Tempermeter, may be expressed as chocolate temper units (CTU) and/or as a slope measurement. CTU measurements can be expressed in either Fahrenheit or Celsius temperature scale terms. All CTU measurements herein referred to herein are in the Fahrenheit scale, unless otherwise specified. Fahrenheit CTU measurements can be converted to Celsius scale by dividing by a factor of 1.8. Higher CTU values and lower slope values correspond with higher levels of temper. If there is no detectable inflection in the 5 minute trace, the chocolate would typically be assessed as having no temper.

11. The term "low temper" refers to temper which cannot be detected, i.e., no inflection, with a Tricor Tempermeter during a 5 minute trace, but which can be measured with a Tricor Tempermeter which has been modified to perform a 9.5 minute trace. The units of measurement are the same as used for the measure of "temper". If there is no detectable inflection in the 9.5 minute trace, i.e., the longest test time currently available with a Tricor unit, the chocolate would by necessity be assessed as having no temper, whereas it is believed that there is no commercially available instrument with a lower limit of detection.

Chocolate temper levels may be measured with a Tricor Tempermeter which characterizes the thermal properties of a chocolate subjected to a controlled cooling regime. This technique measures an inflection point in the cooling curve or trace and uses this data to produce a value for the temper level of a chocolate, expressed in Chocolate Temper Units (CTU) and as a slope value for the inflection. Higher CTU values and lower slope values correspond to higher levels of chocolate temper.

The Tricor Tempermeter is typically run using a 5 minute test period to produce the cooling trace for the temper determination. If a chocolate does not show an inflection during the 5 minute run, it would typically be described as having no temper. However, with a modification of the tempermeter to extend the cooling period to 9.5 minutes, it is possible to detect temper, i.e., an inflection point, in some samples which did not register any temper in the 5 minute trace. Temper detectable in a 9.5 minute trace, but not in a 5 minute trace is defined as "low temper". If a chocolate does not show an inflection point during a 9.5 minute trace it would then be described as having no temper, however, it is still possible for such chocolates to have some temper.

To measure temper levels below this limit, a method was developed using a rotational rheometer, in this case a Carri-Med Controlled Stress Rheometer Model CSL 500. By performing controlled cooling and shearing tests it is possible to compare the onset temperature of crystallization for chocolate with no inflection in a 9.5 minute trace to the onset temperature for the same chocolate which has been de-tempered through heating prior to analysis to ensure a true no temper condition. This difference in onset temperature is defined as a Rheological Temper Unit (RTU). The range of temper between truly no temper chocolate and the lowest level measurable in a 9.5 minute trace with a Tricor Tempermeter is defined as ultra-low temper. A more detailed description of the technique is given below.

12. The term "molding" refers to methods wherein chocolate, either plain or mixed with additives such as nuts, raisins, crisped rice and the like is deposited in molds, allowed to cool and hardened into solid pieces. The chocolates used in molding processes usually can be somewhat more viscous than coating chocolates since the chocolate can be vibrated and/or forced into a mold over a longer period of time than allowed in enrobing, for example. However, chocolate molded with food inclusions generally must be as fluid as coating chocolates.

13. "Reduced calorie fat", as used herein, is a fat having all the properties of typical fat but exhibiting less calories than typical fat. An example of a reduced calorie fat is Caprocaprylobehein (commonly known as Caprenin®) as described in U.S. Pat. No. 4,888,196 to Ehrman, et al., which is incorporated herein by reference.

14. The term "temperable fat" is intended to refer to cocoa butter and other fats having properties similar to cocoa butter and which are tempered in the same manner as for cocoa butter. "Temperable fats" can exist in a number of different crystalline forms or polymorphs and which are typically processed by tempering to provide seed crystals of the more stable crystalline polymorphs.

The term "temperable fat" does not include fats or fat-like materials that do not require tempering. The term does not include fats that are typically tempered by methods which are significantly different than those methods typically used for tempering cocoa butter.

For example, Caprenin® is a material sometimes used as a fat replacer, but would not be considered a "temperable fat" according to the invention since its method of setting is different from that of cocoa butter. Caprenin® is a low calorie fat replacer developed by Procter and Gamble to replace cocoa butter functionally and organoleptically. The Caprenin® molecule is a triglyceride with a glycerine backbone and a mixture of caprylic, capric and behenic fatty acid chains. The length of the behenic fatty acid chain inhibits absorption of the molecule as a triglyceride in the human body. This property, which reduces the effective caloric density of Caprenin®, also leads to significant difficulties in crystallization and solidification. Caprenin® containing chocolate-like coatings, for example, require careful handling to achieve the desirable properties for the finished product. In fact, Caprenin®-based chocolate flavored compositions are conventionally set by tempering and cooling methods that differ significantly from those methods typically used for cocoa butter.

The alpha state of Caprenin® forms readily. The beta state, however, does not occur easily or quickly. Significant experimentation was necessary to develop procedures that would allow the stable form of Caprenin® to develop. As set forth in U.S. Pat. No 5,275,835 to Masterson, if chocolate products based on caprenin are tempered using typical equipment and conditions conventionally used for cocoa butter-based chocolate products, i.e., rapidly cooling to about 82 to 86° F. (27.8 to 30.0° C. and then warming to about 88 to 93° F. (31.1 to 33.9° C.), the products do not harden sufficiently when cooled to be wrapped or otherwise packaged, nor shrink sufficiently in molds to be easily demolded with glossy appearance, and will develop bloom.

In fact, Caprenin®-based chocolate flavored compositions are conventionally set by cooling methods that differ significantly from conventional cooling methods used for cocoa butter. The term "Caprenin®-based chocolate flavored compositions" refers to those compositions wherein greater than 50 wt% of the fat is Caprenin®. U.S. Pat. No. 4,888,196 discloses rapidly cooling a Caprenin®-based chocolate flavored composition to temperatures below 57° F. (13.9° C.) and holding at that temperature for more than 16 hours, which is sufficient to form, or nucleate, an effective amount of beta crystals from a portion of the Caprenin®. The cooled composition is then warmed to a temperature in the range of from about 57 to about 72° F. (about 13.9 to 22.2° C.) to transform the remaining portion of the Caprenin® into stable beta crystalline phase in about 4 to 120 hours. Using the tempering scheme disclosed in U.S. Pat. No. 4,888,196, it typically takes from about 1 to about 3 days after preparing the molten chocolate mass to obtain the chocolate-flavored products which are stable against resulting bloom formation, especially when subjected to thermal stress. Holding for less than 24 hours resulted in an unsatisfactory product.

U.S. Pat. No. 5,275,835 to Masterson relates to a process for preparing chocolate-flavored confectionery compositions containing the reduced calorie substitute fat Caprenin® using certain dynamic tempering conditions. An object of the patent is reducing the time needed for tempering flavored compositions. The method involves dynamically tempering the compositions by rapidly cooling from a non-crystalline state to a temperature of less than about 70° F. (21.1° C.) and then warming the composition to about 85° F. (29.4° C.) while subjecting the tempered composition to shear agitation and subsequently setting the tempered chocolate by cooling.

Comparing these processes with those set forth above regarding conventional chocolate processing, it can be seen that all fats that can be tempered do not behave like cocoa butter. Such fats are not intended to be included within the scope of the invention.

15. The term "stable fat crystals" refers to those crystalline forms or polymorphs that are stable at higher temperatures, that is these polymorphs have higher melting points. For cocoa butter, six crystal polymorphs have been recognized and characterized both by thermal analysis and X-ray diffraction and these six forms are well known to those skilled in the art of chocolate manufacture (see Wille et al. "Polymorphism of Cocoa Butter", J. Am. Oil Chem. Soc., Vol. 43 (1966) pages 491–96). Referring to cocoa butter then, the term "stable fat crystals" is meant to include the form V and form VI polymorphs which melt at higher temperatures. The term "unstable fat crystals" refers to the remaining lower melting lower polymorphs.

16. The term "gloss" refers to a physical property which is characteristic of the visual appearance of a chocolate and is very important for consumer acceptance. More specifically, gloss refers to the ability of the surface of a chocolate product to reflect incident light giving a "shiny" or "glossy" appearance. Gloss can be measured in a variety of ways both visually and instrumentally.

17. The term "glossy" refers to a chocolate having an acceptable gloss, i.e., not dull, substantially uniform, etc. Although a relatively subjective term, the use of the term is well known to those skilled in the art. The term "gloss perception" notes the perceived gloss attributed to planar surfaces and sharp edges.

18. Viscosity

Chocolate displays non-Newtonian rheology and cannot be totally characterized by a single rheological measurement point. Despite this, apparent viscosity is a simple measure of viscosity useful for the evaluation of tempered and untempered chocolates and their suitability for operations such as enrobing and molding. The measurement of apparent viscosity can be accomplished by many methods. The method used herein for apparent viscosity measurements is as follows: The chocolate is maintained at the desired measurement temperature. The viscosity is measured using a Brookfield viscometer Model RV equipped with a "B" size T-spindle (approximately 36.4 mm cross-bar) and operating at 4 RPM. The spindle is immersed in the chocolate to be measured and allowed to rotate three times. The reading is taken after the third rotation and multiplied by 1000. The resultant value is the apparent viscosity in centipoise. The term "forming" includes decorating, shaping, embossing or any other methods of producing a chocolate having a desired shape, form or appearance.

19. The term "shape" refers to any three-dimensional forms including cubic shapes, animal shapes, etc.

20. The term "mold" refers to a device having at least one mold cavity which defines the shape of the molded product. A tempered chocolate composition is deposited into a mold cavity and may be vibrated or tamped to ensure that it completely fills the cavity. The term "mold" is intended to exclude devices which are pressed onto a chocolate composition, e.g., embossers and formers.

21. The term "depositing" refers to any method for introducing a fat-based confection composition onto the contacting surface of a mold. Methods of depositing include, but are not limited to, introduction through a nozzle and flooding.

It is also considered to be optional in any embodiment of this invention to coat the contacting surface of the mold with a material which decreases the surface energy of the contacting surface of the mold.

In one embodiment of the invention, a fat-based confection composition is deposited into a mold constructed from a material having a thermal conductivity greater than about 100 W/m° C., preferably greater than about 150 W/m° C., e.g., a metal. At the time the fat-based confection composition is deposited, the mold is at a temperature above about 10° C., preferably above about 15° C. Immediately after deposition, the mold is cooled rapidly to a temperature below about −5° C., preferably below about −10° C., and maintained at a low temperature for a time sufficient to achieve complete demolding of the product. A product with good gloss is obtained. Preferably, cooling is achieved primarily by means of gaseous convection, preferably with a heat transfer coefficient ("H value") greater than about 50 W/m²° C. Preferably, the fat-based confection is chocolate.

Another embodiment of the present invention relates to depositing the chocolate composition into the mold by means of a nozzle which is inserted into the mold prior to depositing the chocolate composition and withdrawn during deposition. Optionally, another edible mass and the chocolate composition are co-deposited into the mold, either simultaneously or sequentially. Optionally, the mold is a hollow mold made from at least two separable parts. Optionally, the hollow mold is spun after deposition of the chocolate composition to form a hollow spin-molded chocolate product.

Another aspect of the present invention is optimized cooling of molded chocolate products. Unlike conventional cooling, the optimized cooling process operates over a wider range of cooling conditions. It has been shown that the average cooling rate for a chocolate composition contacted with a mold having a contacting surface temperature of at least about 10° C., i.e., the total temperature drop while the chocolate is in the mold divided by the total time in the mold, measured at the geometric center of the molded product, can be as high as 10° C./minute. Preferably the average cooling rate is from about 4° C./minute to about 9° C./minute, more preferably from about 5° C./minute to about 8° C./minute, and most preferably from about 6° C./minute to about 7° C./minute. The optimal process parameters for optimized cooling depend upon a number of factors including the chocolate composition being cooled. The fat content of the chocolate, for example, can influence process parameters.

FIG. 1 shows that the crystallization time of chocolate is at a minimum between approximately 17° C. and 23° C. Thus, optimized cooling of a chocolate composition containing a liquid fat phase will quickly bring the composition into this optimum range, where it will crystallize quickly.

Optimum results are typically obtained by cooling so as to avoid an instantaneous cooling rate in the center of the molded product greater than about 15° C./minute. Cooling in excess of this rate may result in unstable chocolate, which can be transformed into stable chocolate by controlled reheating, but this additional treatment results in a loss of efficiency. It should also be recognized that, in molding non-compact shapes having outlying regions of small cross-sectional area, it may be difficult to avoid undesirably high cooling rates in those regions.

Another important factor in determining optimum cooling rates is chocolate temper. This invention is intended to be practiced using chocolate with a normal temper range, i.e., chocolate with a temper of 3–8° F. CTU (1.7–4.4° C. CTU). Over-tempered chocolate can, of course, be cooled at a much higher rate than chocolate of normal temper. However, over-tempered chocolate is highly viscous and consequently rather difficult to process.

Use of rapid average cooling rates allows rapid demolding of the finished molded chocolate product. This in turn allows faster cycling of molds through the molding process. Consequently, molded chocolate production can be carried out more quickly with fewer molds. The likelihood of production shutdowns resulting from downtime due to problems such as, for example, broken molds will be decreased. Further, more rapid cooling allows use of shorter cooling tunnels, maximizing efficient use of floor space in the processing plant.

In any of the embodiments of this invention recited hereinabove, it is optional for the contacting surface of the mold to have a surface energy lower than 30 mJ/m² as measured at 23° C. according to a "three liquid" contact angle procedure, as described in R. J. Good and C. J. van Oss, *Modern Approaches to Wettability—Theory and Application*, pgs. 1–27, M. E. Schrader and G. I, Loeb, Eds., Plenum, N.Y. (1992), to facilitate release of the molded chocolate from the mold. It is also optional to construct the mold using a flexible material. Improved molding techniques suitable for use in these embodiments are disclosed in Provisional U.S. Patent Application No. 60/070,874, entitled "IMPROVED MOLDING PROCESS" filed Jan. 9, 1998, and herein incorporated by reference.

In an embodiment of this invention, a hollow "egg-shaped" molded chocolate shell is produced in less than 5 minutes, whereas conventional methods require a much longer time. Two halves of the shell are produced separately by inserting a chilled plunger into a chocolate composition in a mold having a suitable shape as described in U.S. Pat. No. 5,635,230, incorporated by reference herein in its entirety. The plunger is allowed to contact the chocolate composition for a time which will result in an average cooling rate in the interior of the chocolate composition of from about 3° C./minute to about 10° C./minute, preferably from about 4° C./minute to about 9° C./minute, more preferably from about 5° C./minute to about 8° C./minute, and most preferably from about 6° C./minute to about 7° C./minute. The edges of the shell halves are then heat-treated and book-molded together to form the complete shell by methods well known in the art.

The examples which follow are intended to illustrate certain preferred embodiments of the invention, and no limitation of the invention is implied.

COMPARATIVE EXAMPLE 1

A milk chocolate composition is prepared using the formulation shown below:

| Milk Chocolate Composition: | |
| --- | --- |
| Sugar | 50% |
| Cocoa Butter | 20.49% |
| Whole Milk Powder | 18.0% |
| Cocoa Liquor | 11.0% |
| Lecithin | 0.50% |
| Vanillin | 0.01% |

The chocolate mixture is refined to reduce the solid particle sizes to 25 microns and then loaded into a Petzholdt Conch. The chocolate is dry conched for 6 hours after which lecithin is added. The chocolate is then spun in the conch for 30 minutes. The conched chocolate is transferred to a tank where additional lecithin and cocoa butter are added to achieve an apparent viscosity of 20,000 cps at 45° C. (standardization). The standardized chocolate is then tempered in a continuous Sollich Soltemper-Turbo Model MSV3000 where the chocolate is cooled from 45° C. to 25° C. with aggressive shear to produce cocoa butter of stable and unstable polymorphs. The tempered chocolate is warmed slightly in the last phase to 31° C. to melt out unstable crystals. The tempered chocolate is at 31° C. and has a temper level of 6CTU (° F.) and −0.5 slope as determined by Tricor Tempermeter Model 501. The chocolate is then pumped to the hopper of Knoble One Shot depositor.

Caramel is prepared using the formulation shown below and is prepared in a manner similar to that described in Minifie, 3rd Ed pp 533–537, and pumped to the hopper of the Knoble One Shot depositor.

| Soft Caramel Formulation: | |
| --- | --- |
| Corn Syrup | 40.0% |
| Sweetened Cond. Whole Milk | 37.40% |
| Sugar | 13.50% |
| Milk Butter | 5.19% |
| Water | 3.40% |
| Salt | 0.05% |
| Flavorings | 0.01% |

500 g polycarbonate egg molds were deposited with the caramel and chocolate with the one shot deposited at a shell to center ratio of 60:40 by weight. The chocolate deposit temperature was 29° C. and the caramel deposit temperature was 32–36° C. The egg cavities were filled in 4 seconds, and cooled in a cooling tunnel at +10° C. for approximately 35 minutes where it was then demolded. The resulting sample was glossy and stable (as used herein, "stable", refers to that which does not become tacky or melts at 20° C.).

COMPARATIVE EXAMPLE 2

Chocolate was prepared as in Comparative Example 1 and pumped to the depositor of a molding line. The chocolate was ribbon deposited into 100 g polycarbonate bar molds. The chocolate was vibrated to level the chocolate and remove any unwanted air bubbles and then cooled for 40 minutes at 15° C. with low "H" value (≈20 w/m²° C.). The molds were then inverted and struck to demold the bars from the mold. The resulting bar was glossy and stable.

Example 1

Chocolate was prepared as in Comparative Example 1 and pumped to the depositor of a molding line. The chocolate was ribbon deposited into 100 g polycarbonate bar molds. The chocolate was vibrated to level the chocolate and remove any unwanted air bubbles and then cooled in a cooling tunnel where the temperature was −15° C. with low "H" value (~20 W/m²° C.) for 6 minutes. The mold was then inverted and struck to demold the bar. The resulting bar was glossy and stable.

Example 2

Chocolate was prepared as in Comparative Example 1 and pumped to the depositor of a molding line. The chocolate was ribbon deposited into 100 g polycarbonate bar molds. The chocolate was vibrated to level the chocolate and remove any unwanted air bubbles and then cooled in a cooling tunnel where the temperature was 10° C. with high "H" value for 8 minutes. The mold was then inverted and struck to demold the bar. The resulting bar was glossy and stable.

COMPARATIVE EXAMPLE 3

Chocolate was prepared as in Comparative Example 1 and pumped to the depositor of a molding line. The chocolate was ribbon deposited into 100 g polycarbonate bar molds. The chocolate was vibrated to level the chocolate and remove any unwanted air bubbles and then cooled in a cooling tunnel where the temperature was −15° C. with high "H" value (~100 to 125 W/m²° C.) for 5 minutes. The mold was then inverted and struck to demold the bar. The resulting bar was glossy, but unstable (that which becomes tacky and melts at 20° C.).

The resulting bar is then further cooled for 6 minutes at 10° C., where in the unstable crystals undergo polymorphism to the more stable form. The bar is then both glossy and stable.

Example 3

Chocolate was prepared as in Example 1 and was pumped into the hopper of a depositor on a cold finger molding line. Molds were cooled to less than 15° C. and then the gob of chocolate was deposited into the mold. The cold finger was set at a temperature of about −15° C. to 20° C. and was brought down into the mold and held for a period of time sufficient to set the chocolate but not sufficient to cause the formation of a large number of unstable crystals, about 2–3 seconds. The shell that was formed was then cooled in a tunnel at 10° C. at a high "H" value for a period of about 3–10 minutes. The shells were then demolded.

COMPARATIVE EXAMPLE 4

Chocolate was prepared as in Comparative Example 1, then mixed with hazelnuts at 16% weight, and pumped into a Jensun depositor. 150 g bar molds were ribbon deposited and vibrated until the chocolate is leveled. The mold was then cooled at 12–15° C. at a low "H" value (~20 W/m²° C.) for 40 minutes where the mold was then inverted and banged to demold the bars. The resulting bars were stable and glossy.

Example 4

Chocolate was prepared as in Comparative Example 1, then mixed with hazelnuts at 16% weight, and pumped into a Jensun depositor. 150 g bar molds were ribbon deposited and vibrated until the chocolate is leveled. The mold was then cooled at −15° C. at a low "H" value (~20 W/m²° C.) for 6 minutes, and the mold was then inverted and banged to demold the bars. The resulting bars were stable and glossy.

Example 5

Chocolate was prepared as in Comparative Example 1, the chocolate was then mixed with hazelnuts at 16% weight, and pumped into a depositor. 150 g bar molds were ribbon deposited and vibrated until the chocolate is leveled. The mold was then cooled at 10° C. high "H" value (~100–120 $W/m^{2°}$ C.) for 8 minutes where the mold was then inverted and banged to demold the bars. The resulting bars were stable and glossy.

Other variations and modifications of this invention will be obvious to those skilled in the art. This invention is not limited except as set forth in the claims.

What is claimed is:

1. A method for producing a stable molded chocolate confection, said method comprising the steps of:
    (a) depositing a tempered chocolate composition containing a liquid fat phase onto a contacting surface of a mold, said mold having an average temperature greater than 10° C.;
    (b) cooling said tempered chocolate composition under conditions effective to produce an average cooling rate in a center of the tempered chocolate composition of from about 3° C./minute to about 10° C./minute; and
    (c) removing said molded chocolate confection from the mold.

2. The method of claim 1, wherein the average cooling rate is from about 4° C./minute to about 9° C./minute.

3. The method of claim 2, wherein the average cooling rate is from about 5° C./minute to about 8° C./minute.

4. The method of claim 3, wherein the average cooling rate is from about 6° C./minute to about 7° C./minute.

5. The method of claim 1, wherein the stable molded chocolate product has a mass no greater than about 150 g and the molded chocolate confection is removed from the mold in less than about 12 minutes after deposition in the mold.

6. The method of claim 1, further comprising contacting a second contacting surface having a temperature less than about 0° C. with the chocolate composition in the mold.

7. The method of claim 6, wherein the second contacting surface is a plunger, and said plunger shapes the chocolate composition into a shell.

8. The method of claim 1, wherein said step of cooling comprises gaseous convective cooling.

9. The method of claim 8, wherein said gaseous convective cooling is performed in a cooling tunnel.

* * * * *

UNITED STATES PATENT AND TRADEMARK OFFICE
CERTIFICATE OF CORRECTION

PATENT NO.    : 6,406,732 B1
DATED         : June 18, 2002
INVENTOR(S)   : Ralph D. Lee et al.

It is certified that error appears in the above-identified patent and that said Letters Patent is hereby corrected as shown below:

Column 4,
Line 3, "includes" should read -- include --.

Column 7,
Line 15, "which" should be deleted.

Signed and Sealed this

Twenty-ninth Day of April, 2003

JAMES E. ROGAN
*Director of the United States Patent and Trademark Office*